Figure 1:
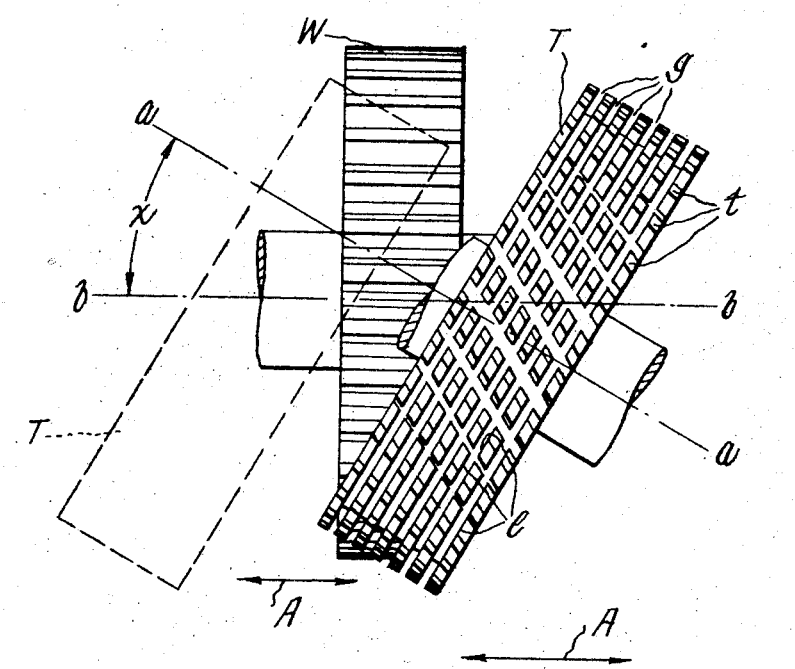

Jan. 4, 1944.　　　　E. W. MILLER　　　　2,338,528
METHOD OF FINISHING GEARS BY SHAVING
Filed June 21, 1939

Inventor
Edward W. Miller

Patented Jan. 4, 1944

2,338,528

UNITED STATES PATENT OFFICE 2,338,528

METHOD OF FINISHING GEARS BY SHAVING

Edward W. Miller, Springfield, Vt., assignor to The Fellows Gear Shaper Company, Springfield, Vt., a corporation of Vermont Application June 21, 1939, Serial No. 280,251

7 Claims. (Cl. 90—1.6)

The art of finishing gears by shaving has been practised heretofore in the following manner. A tool is provided of suitable metal cutting steel in the form of a gear conjugate to the gear to be finished, the teeth of which are intersected by grooves or gashes, forming discontinuous lands bounded by cutting edges in the side faces of the teeth. Tools with helical teeth are employed for finishing spur gears, tools of spur tooth characteristics for finishing helical gears, and, within limitations, helical tools are used for helical gears when the helix angle of the gear is different from that of the tool, or is equal and of the same hand. The tool and work gear are placed with their teeth in mesh and their axes askew at an angle equal to the difference between the helix angles of their respective teeth or, in some instances, the sum of these angles. In cases where either the tool or the work gear has spur teeth, the helix angle of the other is the measure of the skew angle between the axes. The relationship between such axes may be accurately defined by the statement that each intersects, and makes an acute angle with, a line parallel to the other. In common parlance this relationship is more briefly and loosely described by saying that the axes are crossed; and for convenience in the following description the same and similar expressions will be used, but always with the meaning of the foregoing definition.

The intermeshing tool and gear are rotated at a rate of several hunded R. P. M. by power applied to one of them; the one which is positively driven then transmitting rotation to the other through their meshed engagement. At the same time the meshing teeth are caused to bear with considerable force against one another. A rotational speed which gives a linear pitch line velocity of nearly 600 feet per minute has been found the most satisfactory and efficient. At higher speeds a highly deleterious abrasion of the tool takes place. The cutting action which ensues is due wholly to the slippage or skid lengthwise of the mating teeth consequent upon the crossed axis arrangement, which causes such teeth to revolve in converging and diverging paths. A slow feeding movement is imparted to either the tool or the work piece in the direction of the axis of the latter, for the purpose of distributing the action of the tool equally throughout the length of the teeth being finished. Usually the feeding movement has been limited to a few passes (in the order of from two to six) forward and back in the course of the entire operating cycle, with a correspondingly slow average feeding speed.

The present invention relates to the art above described and employs the same principle of a crossed axis arrangement of tool and work gear with one driving the other, and forcible engagement between them. It differs from the prior practice in that it embodies the new step of effecting a rapid relative reciprocation instead of a slow feed between the cutter and work piece in the axial direction of the latter. The objects and accomplishment of the invention are to effect a better cutting action, eliminate more rapidly roughness, irregularities and flat spots of roughly produced gears, and to eliminate, or reduce to a greater degree than has been possible heretofore, the eccentricity which is almost invariably present in greater or less degree in gears produced by gear cutting machines. Although such eccentricity is in the order of a few thousandths of an inch, and seldom exceeds ten thousandths of an inch, in the case of gears produced by the most accurate machines, it is nevertheless objectionable as a cause of noise in the running of gear trains.

I have discovered that by reciprocating the tool rapidly, while also rotating it in crossed axis mesh with the work piece, (or conversely, rapidly reciprocating the work piece), in the direction of the axis of the work piece, far superior results in rapidly finishing the gears to accuracy of tooth form and dimensions, and in the elimination of eccentricity, may be obtained beyond what is possible with the method of crossed axis shaving heretofore practised. This discovery and its practical application in the method of finishing gears constitutes the present invention.

In further explanation, attention is directed to the drawing, in which—

Figure 2:
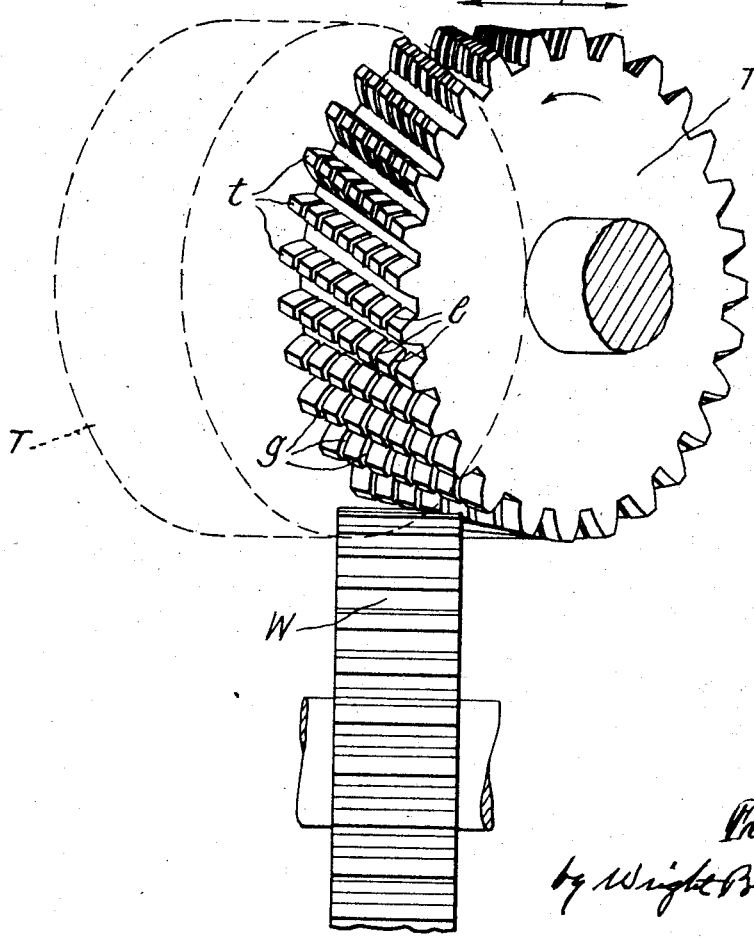

Fig. 1 is a plan view and Fig. 2 a front elevation of a shaving tool and a work gear where the tool is located above the work, in crossed axis relationship, the tool being shown at one end of its reciprocating travel.

The tool of the drawing is designated by the reference letter T and its axis by the line $a$—$a$. The gear being finished is designated by the letter W and its axis by the line $b$—$b$. In this instance the tool is provided with helical teeth and the work is a spur gear. $x$ represents the angle between the line parallel to either axis which intersects the other axis and is considered for the purpose of this description as the crossing angle of the axes $a$—$a$ and $b$—$b$. The helix angle of the teeth of the tool is equal to the angle $x$. It is to be understood that within the scope of this invention a tool having spur teeth may be similarly meshed with a gear having helical teeth, or both the tool and gear may have helical teeth of which the difference or sum is equal to the angle $x$.

The tooth faces $t$ of the tool are intersected by grooves, which may extend either partly or wholly through the teeth, and are here shown as continuous grooves $g$ in planes perpendicular to the axis a—a. Equivalent grooves, however, may be arranged normal to the tooth helices. Where the grooves intersect the side faces of the teeth, cutting edges e are formed.

In accordance with this invention the tool, while being rotated at any desired speed is reciprocated rapidly in the direction of the double headed arrow A between approximately the positions designated in the drawing by the full line and dotted line positions of the tool. The length of this reciprocating motion is determined by the axial length (also called the face width) of the tool and gear, and preferably is as long as possible without bringing the tool clear of its meshing engagement with the gear.

The rate of reciprocation may vary greatly. I have obtained excellent results with a rate of 150 strokes per minute in each direction with a one inch length of stroke. But 150 strokes per minute is far from being the practicable maximum, and rates up to many hundreds of strokes per minute are feasible.

Tools of this character cut equally when traversed in both directions. The cutting due to the stroking or traversing movement is of a character different from that due to the slippage or skid. It is of a freer character and is not accompanied by the condensing or compacting effect due to pressure of the lands of the tool teeth, which occurs when the tool is given no reciprocative movement except a slow feed. In consequence of this freer cutting action, I am able to remove more stock from the work gear in the same length of time, and in a way which reduces the eccentricity of the gear more than is accomplished by the slippage cutting method. Reduction of eccentricity involves removal of more stock from the teeth on the high side of the gear than from those on the low side; and my method effects this result. Furthermore, due to the absence of any substantial condensing or hardening effect by the lands of the tool, more stock can be removed and the eccentricity may be further reduced by a succession of cycles performed according to this invention, with suitable shortening of the center distance between tool and work, until the work gear is perfectly concentric, or essentially so.

In comparing results accomplished by my method with those of the slip method under otherwise identical circumstances, I have noted as much as 70% greater correction of eccentricity obtained by the new method.

It is to be noted that the protection claimed for this method is not limited to the case where the tool is reciprocated rapidly across the face of the work, but includes also reciprocating traverse of the work across the tool and of both tool and work simultaneously in relatively opposite directions. So also may the work be employed to drive the tool.

What I claim and desire to secure by Letters Patent is:

1. The method of reducing eccentricity in gears, which consists in meshing the gear to be finished in crossed axis arrangement with a shaving tool haveing teeth conjugate to the work gear and a plurality of cutting edges in the sides of its teeth, applying torque to one of said members and rotating the other by their meshed relationship and reciprocating one of the members in the direction of the work gear axis at a rate in the order of more than one hundred strokes per minute through a distance of substantially as much as one inch.

2. The method of finishing gears by shaving where the axes of the shaving tool and work gear are crossed at an acute angle and are rapidly rotated in meshing contact, which consists in reciprocating the shaving tool in a path parallel to the axis of the work gear at a rate of reciprocation in the order of more than one hundred strokes per minute in each direction through a distance of substantially as much as one inch.

3. The method of finishing gears by shaving where the axes of the shaving tool and work gear are crossed at an acute angle and are rapidly rotated in meshing contact, which consists in reciprocating the shaving tool in a path parallel to the axis of the work gear with a number of reciprocations per minute in a similar order of magnitude to the number of rotations per minute of the shaving tool through a distance substantially as great as the combined face widths of the tool and work gear.

4. In the method of finishing gears by rotating a conjugate gear-like finishing tool having interruptions forming cutting edges in the sides of its teeth, in mesh in a crossed axis arrangement with a gear to be finished, the new step which consists in effecting a relative reciprocation between the tool and gear in the axial direction of the gear at a rate in the order of hundreds of strokes per minute through a distance greater than the axial length of the gear.

5. The method of finishing gears by shaving which consists in providing a gear-like cutter having transverse cutting edges in the side faces of its teeth intermediate the ends thereof, which teeth are conjugate to the teeth of the gear to be finished, the teeth of the tool and gear being so related helically that when placed in operative mesh the axes of tool and gear are crossed at an oblique angle, placing the tool and gear in mesh with pressure contact between their contacting teeth and with their axes crossed at the prescribed angle, rotatably driving one of the members constituted by the tool and gear and transmitting rotation therefrom to the other of said members, and effecting a relative back and forth reciprocation between the tool and gear in the direction of the axis of the latter at an average speed in the order of at least twenty five feet per minute.

6. The method of finishing gears by shaving where the axes of the shaving tool and work gear are crossed at an acute angle and are rotated in meshing pressure contact, which consists in effecting a relative reciprocation between the shaving tool and the work gear in the direction of the axis of the work gear at a rate of more than one hundred strokes per minute through a distance of at least one inch.

7. In the method of finishing gears by rotating, in mesh and in a crossed axis arrangement therewith, a conjugate gear-like finishing tool having interruptions forming cutting edges in the sides of its teeth, the new step which consists in effecting a relative reciprocation between the tool and the gear, in the axial direction of the latter, at an average speed of travel in the order of more than twenty five feet per minute.

EDWARD W. MILLER.